US008244864B1

(12) United States Patent
Bahl et al.

(10) Patent No.: US 8,244,864 B1
(45) Date of Patent: Aug. 14, 2012

(54) TRANSPARENT MIGRATION OF TCP BASED CONNECTIONS WITHIN A NETWORK LOAD BALANCING SYSTEM

(75) Inventors: Pradeep Bahl, Redmond, WA (US); Joseph M. Joy, Redmond, WA (US); Feng Sun, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 2474 days.

(21) Appl. No.: 09/812,931

(22) Filed: Mar. 20, 2001

(51) Int. Cl.
*G06F 15/173* (2006.01)
(52) U.S. Cl. .................... 709/225; 709/226; 709/228
(58) Field of Classification Search .................. 709/238, 709/239, 226–228, 225; 718/105; 395/674
See application file for complete search history.

(56) References Cited

U.S. PATENT DOCUMENTS

| | | | |
|---|---|---|---|
| 5,307,347 A | 4/1994 | Duault et al. |
| 5,341,499 A | 8/1994 | Doragh |
| 5,343,477 A | 8/1994 | Yamada |
| 5,355,453 A | 10/1994 | Row et al. |
| 5,355,472 A | 10/1994 | Lewis |
| 5,400,335 A | 3/1995 | Yamada |
| 5,404,534 A | 4/1995 | Foss et al. |
| 5,426,427 A | 6/1995 | Chinnock et al. |
| 5,442,749 A | 8/1995 | Northcutt et al. |
| 5,442,771 A | 8/1995 | Filepp et al. |
| 5,452,447 A | 9/1995 | Nelson et al. |
| 5,455,932 A | 10/1995 | Major et al. |
| 5,455,948 A | 10/1995 | Poole et al. |
| 5,495,426 A | 2/1996 | Waclawsky et al. |
| 5,539,883 A | 7/1996 | Allon et al. |
| 5,603,029 A | 2/1997 | Aman et al. |

(Continued)

OTHER PUBLICATIONS

Windows NT Load Balancing Service (WLBS) Features Overview, Posted Jan. 20, 1999 at http://www.microsoft.com/ntserver/ntserverenterprise.exec/feature/wlbs/wlbsfeat.asp?bPrint=T (last visited Sep. 26, 2000) 3 pages.

(Continued)

*Primary Examiner* — Greg C Bengzon
(74) *Attorney, Agent, or Firm* — Zete Law, P.L.L.C.; MacLane C. Key

(57) ABSTRACT

A method and system for enhancing a network load balancing system's ability to distribute connection information and data amongst the plurality of nodes within the system is presented. A client connection request is redirected to a load balancing service residing on a receiving node by modifying the destination port information contained within the packet. The receiving node can be any node within the load balancing system, and is determined from amongst the plurality of nodes that comprise the system by a conventional means. A transparent connection is then established between the client and the load balancing service residing on the node by modifying subsequently transmitted connection setup packets sent by the receiving node and the client. A target node is determined according to resource specific information contained within initially received data packets from the client. The target node determined this way could be the local node or another node. If it is another node, the connection parameters and the data received over the connection are passed to a peer load balancing service residing on the target node. The target load balancing service then instructs TCP/IP to create a Transmission Control Block for the connection and TCP/IP indicates the connection to the appropriate client resource. The target load balancing service sends a "migration completed" message to the receiving node. Upon receiving this notification, the receiving load balancing service instructs a corresponding load balancing driver to stop handling subsequent packets received from that particular client, while the target node is enabled to accept the packets.

35 Claims, 11 Drawing Sheets

U.S. PATENT DOCUMENTS

| | | | |
|---|---|---|---|
| 5,612,897 | A | 3/1997 | Rege |
| 5,774,660 | A * | 6/1998 | Brendel et al. ............... 709/201 |
| 6,182,139 | B1 * | 1/2001 | Brendel ...................... 709/226 |
| 6,185,601 | B1 * | 2/2001 | Wolff ......................... 709/203 |
| 6,742,045 | B1 * | 5/2004 | Jordan et al. ................. 709/238 |
| 6,836,462 | B1 * | 12/2004 | Albert et al. ................. 370/235 |
| 2002/0010783 | A1 * | 1/2002 | Primak et al. ............... 709/228 |
| 2003/0026410 | A1 * | 2/2003 | Lumsden ................ 379/221.01 |

OTHER PUBLICATIONS

Windows NT Load Balancing Service (WLBS) Compared With Other TCP/IP Solutions, Posted Dec. 16, 1998 at http://www.microsoft.com/ntserver/ntserverenterprise/exec/feature/wlbs/how_wlbs_compares.a (last visited Sep. 26, 2000) 2 pages.

Rick Strahl, Scaling Web Applications With Windows 2000 Advanced Server's Network Load Balancing, at http://www.west-wind.com/ (last visited Aug. 2, 2000) 13 pages.

Kosaka, *Resonate Technical Overview-Resonate Central Dispatch TCP Connection Hop*: 1998:1-5; Resonate, Inc., Sunnyvale, CA.

Dias et al., *A Scalable and Highly Available Web Server*, IEEE Comput. Soc. Press, Los Alamitos, CA, USA (1996).

Attanasio et al., *A Virtual Multiprocessor Implemented by an Encapsulated Cluster of Loosely Coupled Computers*, Advanced RISC Systems, IBM T. J. Watson Research Center, Yorktown Heights, NY (Apr. 29, 1992); pp. 1-10.

PC Magazine; Dec. 17, 1996; pp. 42.

BIG/ip Product Specifications; F5 Labs, Inc., USA (1996) pp. 1-6.

*How Your Browser Finds the Page You Want*, PC Magazine, (Mar. 12, 1996) p. 107.

Marks, *That Must Be Some Desk for Intel's New $56M Computer*; San Jose and Silicon Valley Business Journal (Mar. 25-31, 1996).

SOS Corporation, *HydraWEB Frequently Asked Questions*, (Updated Apr. 23, 1996); SOS Corporation, New York, pp. 1-8.

HydraWEB Technologies, *The Smart Resilient HTTP Load-Balancer*, (1996); HydraWEB Technologies, Inc. New York, NY.

Cisco Systems, Inc., Cisco LocalDirector, (1988-1996) Cisco Systems, Inc., pp. 15, retrieved at http://www.cisco.com on Oct. 22, 1996.

WomSpeak; WomPlex; (1996), pp. 1-3.

\* cited by examiner

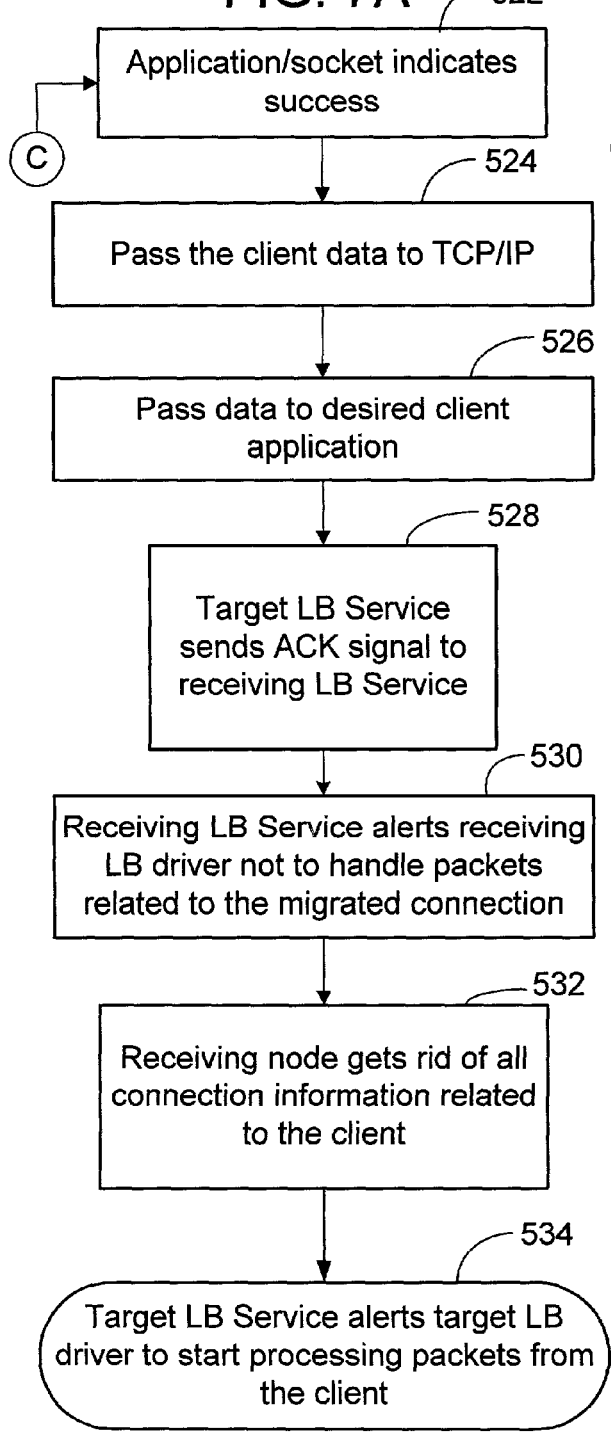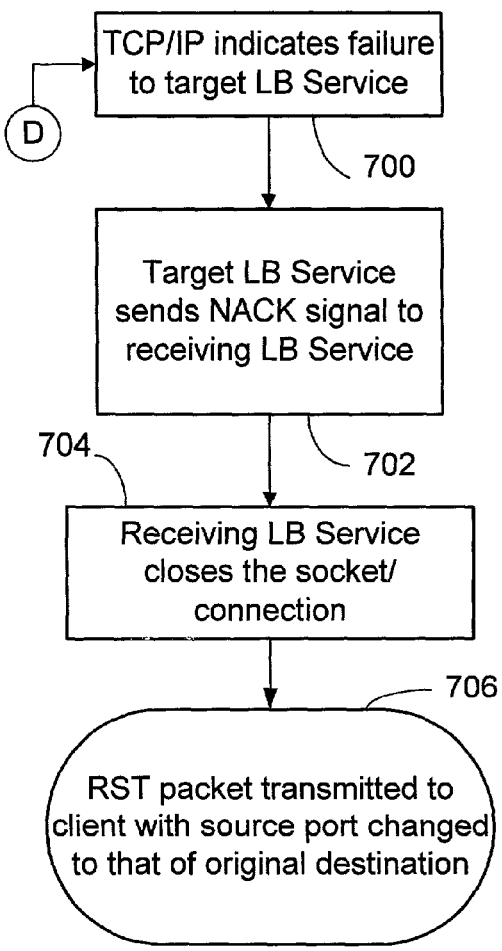

TRANSPARENT MIGRATION OF TCP BASED CONNECTIONS WITHIN A NETWORK LOAD BALANCING SYSTEM

TECHNICAL FIELD

This invention relates generally to systems and methods for network server load balancing, and more particularly to systems and methods of load balancing that are capable of distributing connections based upon resource specific information transmitted by a client.

BACKGROUND OF THE INVENTION

The expansive growth of the Internet has led to a significant transition in the way people communicate and exchange information within our society. Conventional communication tools such as handwritten letters, telephones, and fax machines have been gradually replaced as the primary means of information exchange due to the high availability and popularity of internet based tools such as e-mail messaging and the World Wide Web. Today, the Internet is a global system of computer networks connecting millions of users worldwide using a common addressing system and communications protocol known as TCP/IP. People and businesses around the world can use the Internet to retrieve information, correspond with other Internet users, conduct business globally, and access a vast array of services and resources from on-line. Recent reports show that the Internet has more than 200 million users worldwide, and that number is growing rapidly.

Subsequently, the demands of this incessant growth require an even greater need for ways to maximize the user experience. Internet Service Providers (ISPs), search engines, and high volume websites all have to deal with a growing number of users and rapidly increasing numbers of requests. System administrators grappling with these demands typically respond by purchasing a larger server, but even the most powerful and expensive server can eventually fail or become overloaded. Another option is to create a network server cluster, which consists of a group of servers configured to a common IP address, to handle heavy user traffic. To effectively handle traffic of this nature, it is necessary to employ a methodology known as load balancing to distribute the traffic evenly across the group, or cluster, of commonly addressed machines that the user is trying to access. There are various types of load balancing systems, which include hardware-based solutions from vendors such as Coyote Point Systems and Foundry Networks. There are also software-based solutions such as IBM's eNetwork Dispatcher and Microsoft's Network Load Balancing (NLB) that reside directly on a machine within a network cluster.

To be effective, load balancing must occur within a cluster transparently to the client, and without jeopardizing the client's connection. Conventional load balancing systems utilize various methods, procedures or configuration rules to distribute client traffic effectively throughout the cluster. One such method is known as the Affinity Mode of operation, in which client requests are distributed according to an affinity mode selected by the network administrator of the cluster. In "no affinity" mode, a connection request is distributed amongst the cluster nodes according to the client's source IP address and source port information. In "single affinity" mode, requests are distributed according to only the source IP address. This affinity information is contained within an IP packet that is sent by the client in accordance with the Transmission Control Protocol (TCP) or User Datagram Protocol (UDP). Ownership of a particular IP packet is based on the results of a hash algorithm, in which the affinity information is used to compute which node should handle the request. These current load-balancing schemes enable IP packets to be intelligently distributed to specific nodes within the cluster.

However, this intelligence is not without its limitations. Under the present scheme, some load balancing systems are unable to properly load balance client connections that are related to the same client/server transaction, or session, when those connections are managed by a proxy service. This type of service or device intercepts packets transmitted and received by clients that are members of a common network, such as in a corporate intranet, and then directs the packets to the appropriate destination or source IP address on behalf of the client. Thus, it is an intermediary device that sits in-between the client and the server. When a client behind a proxy transmits a packet to a destination IP address, the packet is assigned the IP address of the proxy device as its source IP address. When this packet is received by a load balancing cluster, the cluster performs load balancing according to the specified source IP address contained within the packet (and optionally the source port). Because the source IP address is that of the proxy however, the cluster can only identify the proxy IP address and not the address of the client that transmitted the packet. Resultantly, the cluster is unable to relate the packet to a particular client or transaction. There are two distinct instances in which this phenomenon can result.

The first instance occurs in situations where multiple client connections are related to a single client session, such as when a client creates multiple connections to perform an e-commerce transaction. In this case, the different connections can end up being managed by different proxies. Even though the connections are related to the same session, different proxies assign the connections to their own respective proxy IP addresses, resulting in related connections having different source IP addresses. A destination cluster that receives these connections can erroneously load balance the connections to different nodes based on the different source IP addresses (single affinity mode), despite the fact that the connections are related.

The second instance occurs in situations where a single proxy manages a large number of clients. As before, the proxy intercepts all packets generated by the various clients before they are transmitted to the destination IP address. Once intercepted, the proxy assigns its own IP address as the source IP address of the packet, and then directs the packet accordingly. When the destination IP address that the packet is directed to is that of a load balancing cluster that distributes client traffic according to the source IP address (as in single affinity mode of operation), all requests from the multiple clients are distributed to a single node within the destination cluster, even though the requests may belong to different clients. This is obviously not the desired functionality of a load balancing system, as this causes the single recipient node to become overloaded, and could further result in decreased performance of the entire cluster network system. Ideally, the different clients should be distributed to different nodes within the cluster for faster processing and efficient traffic management.

Hardware/firmware load balancing solutions that use a central box as a traffic cop or proxy (CBLB—central box load balancers) can deal with the above stated issues because the load balancer in the box can act as an application level proxy. In other words, CBLBs can determine the session binding of multiple client connections through one or more fields in the session/application layer header of the received packet and then keep these connections together when relaying them to the end server node. The field used to determine the session binding could be a cookie or a URL (Uniform Resource Locator) in the case of HTTP connections, or some other field in the session/application layer header relative to the particular task initiated during the session. CBLBs allow incoming packets to be associated with a particular client session (grouped) before the packet is distributed to the end node.

Unfortunately, software distributed load balancers, unlike the central box load balancers, cannot determine the grouping of the connections prior to the connection being formed with an end node. As a result, most software-based load balancing solutions mimic the CBLB by employing a centralized dispatcher model of distribution. U.S. Pat. No. 5,774,660 by Brendel et al. provides a clear example of this model of traffic distribution. As disclosed by the patent, a dedicated node acts as a load balancer or traffic cop that receives all incoming packets to the cluster. The load balancer then determines how the incoming packets are to be distributed, and dispatches the connections to the other nodes within the cluster. This type of operation however, limits the traffic throughput of the system by introducing an additional node (the dispatcher node) between the client and the desired end node. The dispatcher node is always present to receive incoming client packets, even after the end node is determined and the connection is dispatched. Furthermore, the system disclosed by Brendel et al. requires that each server node within the cluster have a different set of resources. However, this requirement can cause the load balancing system to suffer performance drawbacks in situations where a resource (e.g. Web server, custom application, e-mail server) on one of the server nodes is in high demand. Numerous requests for a particular resource residing on a single node can result in overloading.

Suffice to say that in distributed software load balancing solutions, there is no convenient means of ensuring that all connections of a session are handled by the same node, or that connections of different sessions get load balanced to different nodes without incurring the extra overhead of a middleman (e.g. the dispatcher node).

SUMMARY OF THE INVENTION

The invention provides a method for effectively distributing TCP connections and associated data within a network load balancing system. The distribution is determined according to resource specific information contained within the initial data packets that are transmitted by the client during an established session. This method of connection distribution overcomes the current limitations associated with load balancing network systems by allowing for an increased level of connection grouping between related connections. Furthermore, the distribution is achieved without reliance upon a dedicated dispatcher or load balancing node, and is applicable to load balancing systems having mirrored resources on the respective server nodes.

The enhancements afforded by the invention, and the embodiments thereof, are enabled through a simple connection migration scheme. According to this scheme, when a client submits a connection request packet to a load balancing system, a receiving node is determined from amongst the various nodes in the cluster as the owner of the packet based on a conventional means of determination. Once a node is determined, an interceptor, such as a load balancing driver that resides below the TCP/IP stack of the receiving node, redirects the connection request packet and all subsequent packets sent by the client over that connection to a load balancing (LB) service running on the machine instead of allowing the packets to pass directly to the client specified resource residing on the server. The packet is redirected by simply changing the destination port in the TCP header of the incoming connection setup packets (SYN, ACK) and all subsequent data packets from the client specified destination port, to the assigned port number of the LB service. Likewise, for outgoing packets (SYN-ACK, ACK), the source port is changed from that of the LB service to the port number of the client intended resource. This allows for the formation of a connection between the client and the LB service on the receiving node, but appears to the client as a connection with the intended resource residing on the server. Thus, all of the data received during this session is received directly by the LB service.

When the LB service receives at least an initial data packet sent over the connection, it hashes over resource specific information contained within one or more fields of the data packet, such as a URL or a cookie in an HTTP packet header. The resource specific information is used to determine the identity of a "target node" that must handle the connection and all data that flows over it. The target node determined this way can be the receiving node or another node. If it is another node, the connection parameters and the data received on the connection are passed to the corresponding LB service residing on the target node. The LB service on the target node then instructs the TCP/IP stack into creating an endpoint for the connection and indicates the connection to the target application or resource just as it would do had it received the connection setup packets directly from the client. Once the connection is indicated to the target application by TCP/IP and is accepted by that application, the data packets are passed up to it. Also, the LB service on the target node sends instructions to the LB service on the receiving node indicating that the migration was completed successfully. On receiving this confirmation, the LB service on the receiving node instructs a corresponding LB driver to stop handling subsequent packets from that particular client. The LB service on the new owner then instructs its corresponding LB driver to begin accepting packets on the same connection. This completes the migration process in its entirety.

The advantages of the present invention will become more apparent from the accompanying drawings and from the detailed description that follows.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7A is a flowchart showing steps executed in an embodiment of the invention to complete the migration process between nodes in its entirety;

FIG. 7B is a flowchart showing steps executed in an embodiment of the invention to discontinue the migration process between nodes;

Figure 1:
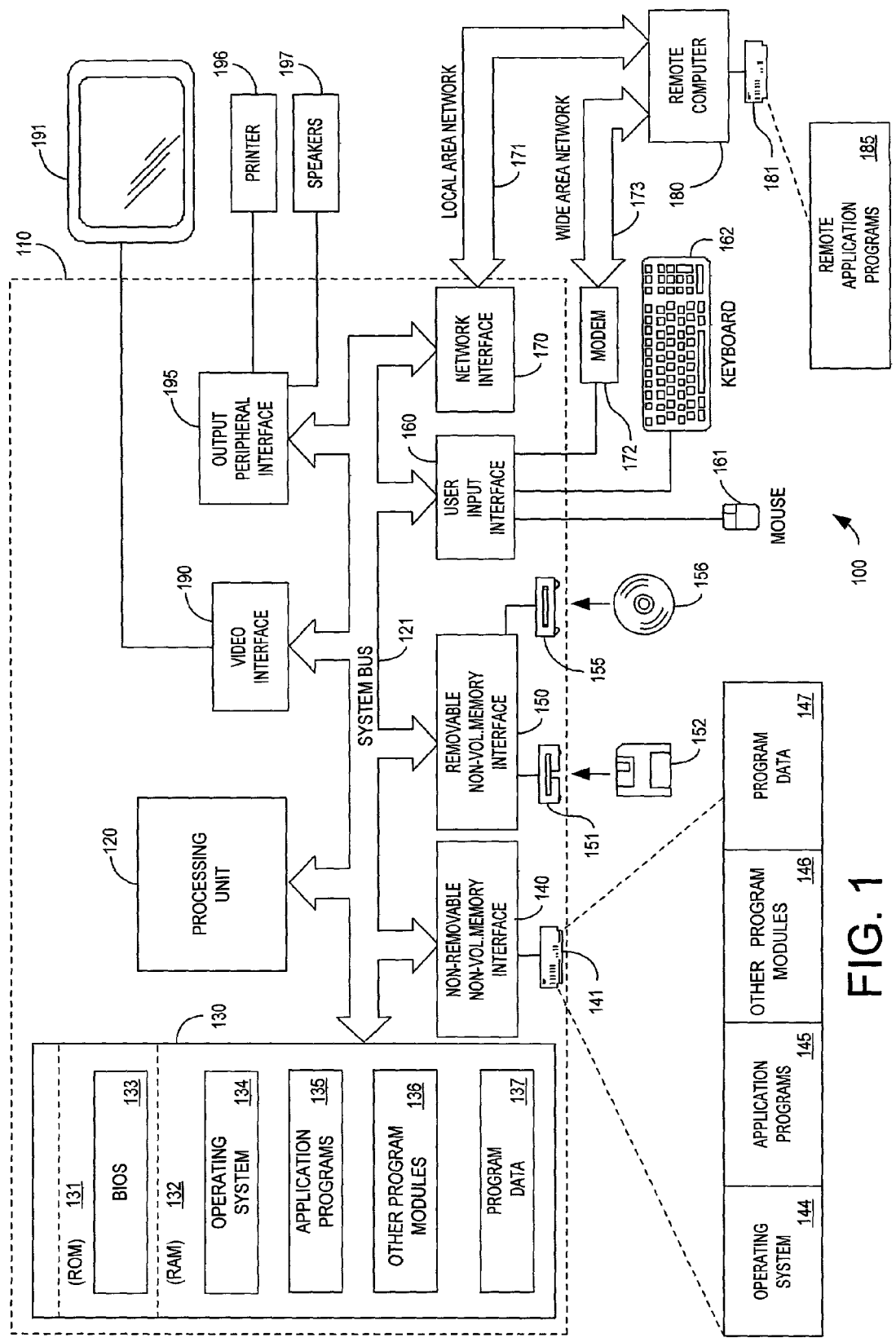
FIG. 1 is a block diagram of an exemplary computer system on which the present invention may reside.

Additional features and advantages of the invention will be made apparent from the following detailed description of illustrative embodiments that proceeds with reference to the accompanying figures.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that the various acts and operations described hereinafter may also be implemented in hardware.

The present invention relates to a method for distributing connection information and data relative to a client session within a network load balancing system. The distribution is determined according to resource specific information contained within the initial data packets that are transmitted by the client during or upon establishment of the session. This resource specific information is contained in one or more fields or code bits of one or more (typically one) data packets transmitted by the client, and is unique to a specific type of application, communication process, user, or session. More specifically, this information identifies the following: (1) the resource or application being accessed, (2) the client performing the accessing of the resource, (3) the unique session under which the resource is being accessed, and/or (4) the data contents pertaining to the resource that is being accessed. As recognized by those skilled in the art, resource specific information refers to any information stored within an IP packet that can affect a load balancing decision. For instance, in HTTP connections, the invention calls for load balancing that can be performed based on resource specific information contained within the HTTP header of a transmitted data packet. In this case, the resource specific information can be a cookie or URL that is specified in the header. A destination load balancing system receiving the data packet carrying such information, and particularly when taken in conjunction with a specified source IP address, can then easily group all packets related to the same application, session, or user (multiple sessions of the same user can be grouped through a user identifier carried in the packet as a cookie) together on the same node. This ensures that related connections are not improperly separated. Moreover, the load balancing system can better direct the packet to the node having the resource or application best aligned with the resource specific information indicated by the client.

As a result of the increased connection grouping capabilities afforded by the invention, enhanced load balancing can be achieved between, and within a group of nodes that are configured to a network according to a shared IP address, such as a virtual IP address. This includes, but is not limited to, a network cluster, nodes that access a network through a proxy or Network Address Translation (NAT) service or device, virtual private networks, and nodes that are members of a server farm. It will be further recognized by those skilled in the art that the methods of the invention, when implemented within systems such as those mentioned above, allow for a multi-level approach to load balancing that occurs "transparently" to the client. Transparent connection migration is described in subsequent paragraphs, and refers to a process by which packets are "redirected" in order to formulate a pseudo client/server connection.

In the context of a networked environment, such as that provided via the Internet, transactions are typically characterized as client/server sessions. As used herein, the term "session" refers to the establishment of one or more connections that are related to a specific application or process, transaction, task or procedure or user. Furthermore, a session can refer to groups of applications, processes, transactions, tasks, or users. While this document makes general reference to TCP sessions, it will be appreciated by those skilled in the art that the embodiments of the invention are applicable to other TCP/IP protocol based client/server sessions. This includes, but is not limited to HTTP, FTP, SMTP, and PPTP sessions. The scheme for distributing connection information and data, referred to as migration, can in fact be generalized to work with any other protocol on top of TCP where the first one or two packets sent during an established session contain enough information (resource specific information) to uniquely identify the client session and determine the end node that should service the session. This includes IPSEC and SSL traffic, wherein the migration of a connection would also require migration of any associated security credentials related to the connection.

Also, the terms "client" and "server" refer to a process of information exchange between two or more devices, wherein the server device services the request initiated by a client device. Those skilled in the art will recognize however, that the terms are as interchangeable as the client/server process itself. Thus, a dedicated server computer or device may at some point during a session act as a client that requests services, and a client computer or device can at times act as the server of that request. For this reason, the systems and methods of the invention may be embodied in traditional client machines as well as traditional server machines. Indeed, the systems and methods of the invention may be practiced in a variety of environments that require or desire the performance enhancements provided by the invention.

Figure 2:
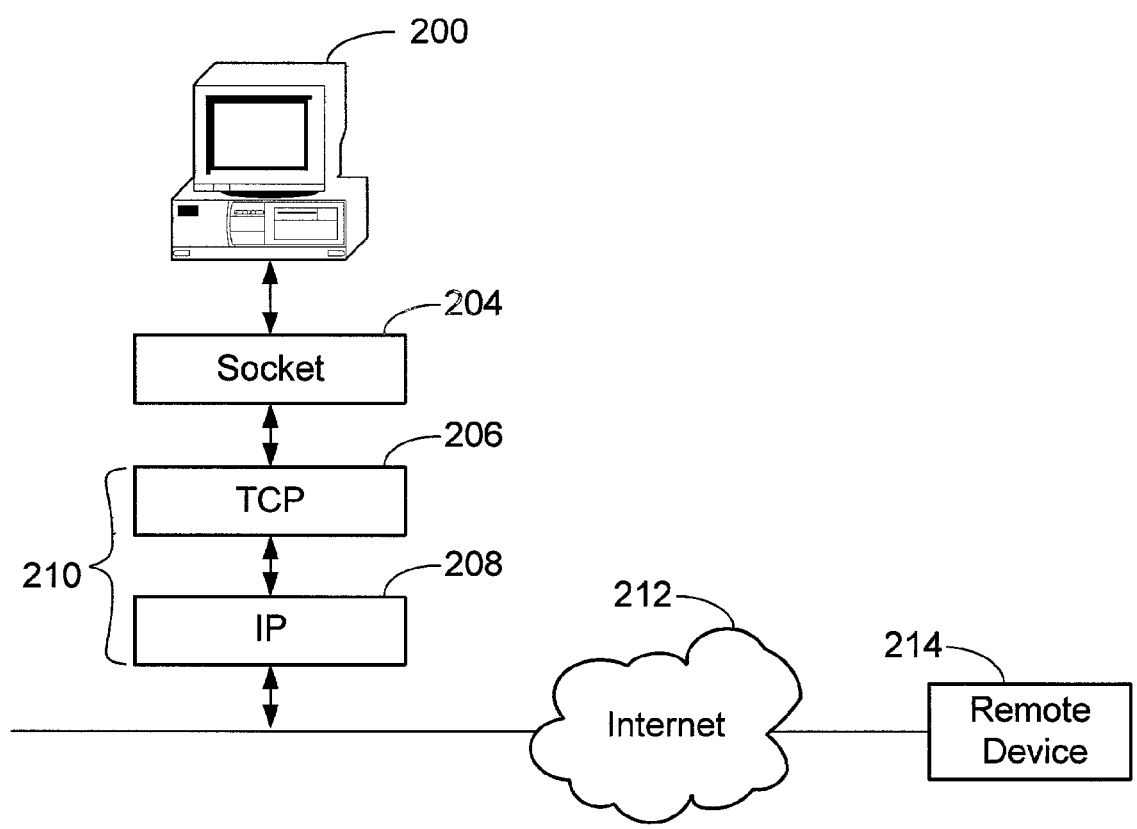
FIG. 2 is a simplified network architecture diagram showing a computer system coupled to a network for the purpose of accessing a remote device via the Internet.

With reference to the drawings, FIG. 2 illustrates a simplified diagram of computer 110 showing the layers of its network protocol stack. The computer 110 is capable of executing client/server application programs 145 according to the executable instructions of the operating system 144. The client/server application program can transmit a data packet in response to a specific client command or process. Conceptually, the data packet is passed through a series of layers known as the TCP/IP stack 210 that provide the control and processing information needed to establish the client/server connection. A socket 204 containing the desired destination address and port information indicated by the application is passed along with the data to TCP/IP. The TCP layer 206 exists above the IP layer 208. The IP layer 208 is then coupled or connected through an ISP, proxy, NAT, etc. (not shown) to a network, such as the Internet 212. This network 212 provides the ability for multiple remote devices 214, such as a PC system or handheld device, to access or send requests to and receive responses from the computer 110. However, in accordance with one of the teachings of the present invention, the process by which a connection is established between the client/server application running on the computer 110 and the remote device 214 is modified, such that a transparent client/server session is formed.

Figure 3:
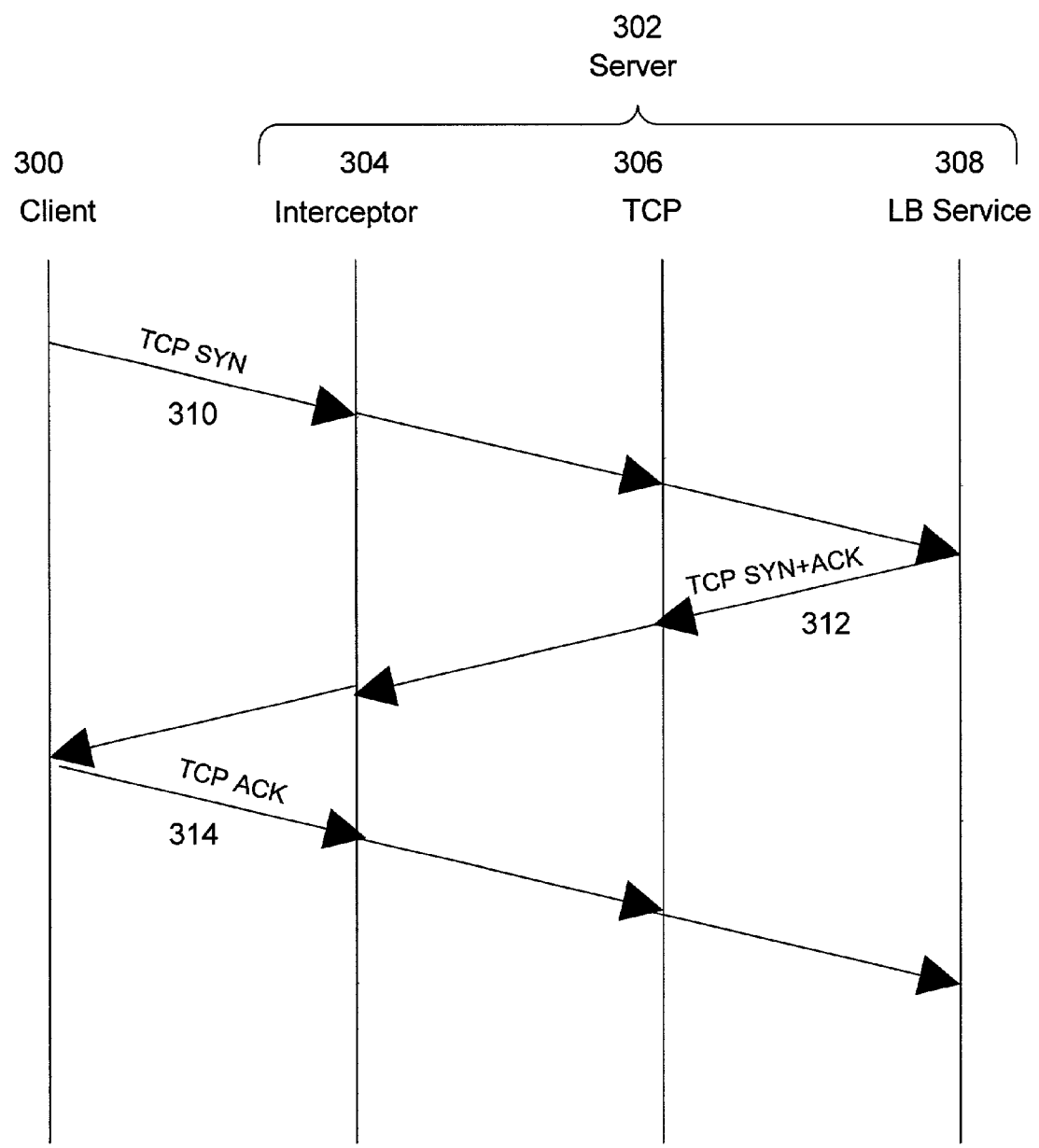
FIG. 3 is a simplified diagram of the three way handshake process that initiates a client/server connection.

Specifically, with reference to FIG. 3, a client machine 300 can communicate with a server machine 302 over a common network such as the Internet or an intranet by formulating a client/server connection. The communication process begins when the client generates and transmits a TCP SYN packet 310 to the server machine 302. This packet, which contains no data, begins the three-way handshake process that establishes the connection and could be invoked by an application or service running on the client machine, such as a Web browser. When the packet is transmitted to a load balancing system 400 shown in FIG. 4, the server 302 acquires the packet based on the results of a conventional hashing mechanism. Before passing the packet to the TCP stack 306 of the server node, however, the packet is acquired by an interceptor 304 (FIG. 3) that modifies the packet. This interceptor can be of various forms, including but not limited to a hardware based module such as a router, a software or firmware component residing on an intercepting device, or a mini-port driver that operates within the network protocol stack of the server node 302. Within the stack, the interceptor can operate between the IP and TCP drivers of the TCP/IP stack where it is called upon by IP before the packet is passed up to TCP, or alternatively, can operate below the TCP/IP stack. In the illustrated embodiment of the invention, the interceptor is shown as a load balancing (LB) driver 412 that operates below the TCP/IP stack of a server node. This implementation is commonly referred to as an interception shim. However, the method of the invention is not intended to be limited to any one implementation, as any means by which the packet can be intercepted and subsequently modified before being passed to TCP/IP, or modified while passing through the TCP/IP stack through a callback function and into the interceptor, is within the scope of the invention.

Once received, the LB driver changes the destination port number specified within the packet header to the assigned port number of a corresponding LB service 308 residing on the same server machine 302. This modification results in the packet being re-directed from the client intended resource residing on the server (as specified by the original destination port), to the LB service residing on the server. The LB driver 304 then passes the packet up to the TCP layer 306 as it would be normally. Upon receiving this packet, TCP allocates a TCP control block for the connection and creates a connection descriptor. As a result of the modifications to the packet however, the TCP control block and connection descriptor specify the destination port as that of the LB service, and not the original destination port indicated by the client. The LB service 308 is then notified of this connection request, and upon acceptance of the request, invokes TCP to generate a TCP SYN+ACK packet back to the client 312 in response to its connection request 310. As can be easily realized by those having skill in the art, the SYN+ACK can be sent by TCP/IP automatically before informing the resource (LB service in this case) about the connection. For the purposes of illustration however, FIG. 3 as shown is a generalized representation of the three-way-handshake process, and in no way implies a limitation upon the operation or implementation of the connection setup procedure or of the invention itself.

In keeping with the invention, the TCP SYN+ACK packet is modified by the LB driver 304, before being transmitted to the client. The LB driver 304 intercepts the packet, such as through a callback function that is initiated by the TCP stack, and then modifies the packet such that it indicates the source port number that was specified by the client. The TCP checksum value is also changed to account for the port change. By modifying the packet to indicate the originally specified port, the client is unaware that the response is generated by the LB service as opposed to the intended resource. This process is continued for any subsequently transmitted TCP connection setup packet(s) 314, resulting in the formation of a connection between the client and the LB service. Consequently, the client 300 is oblivious to the fact that the connection is made with the LB service residing on the server, and so a "transparent" connection is established.

Figure 4:
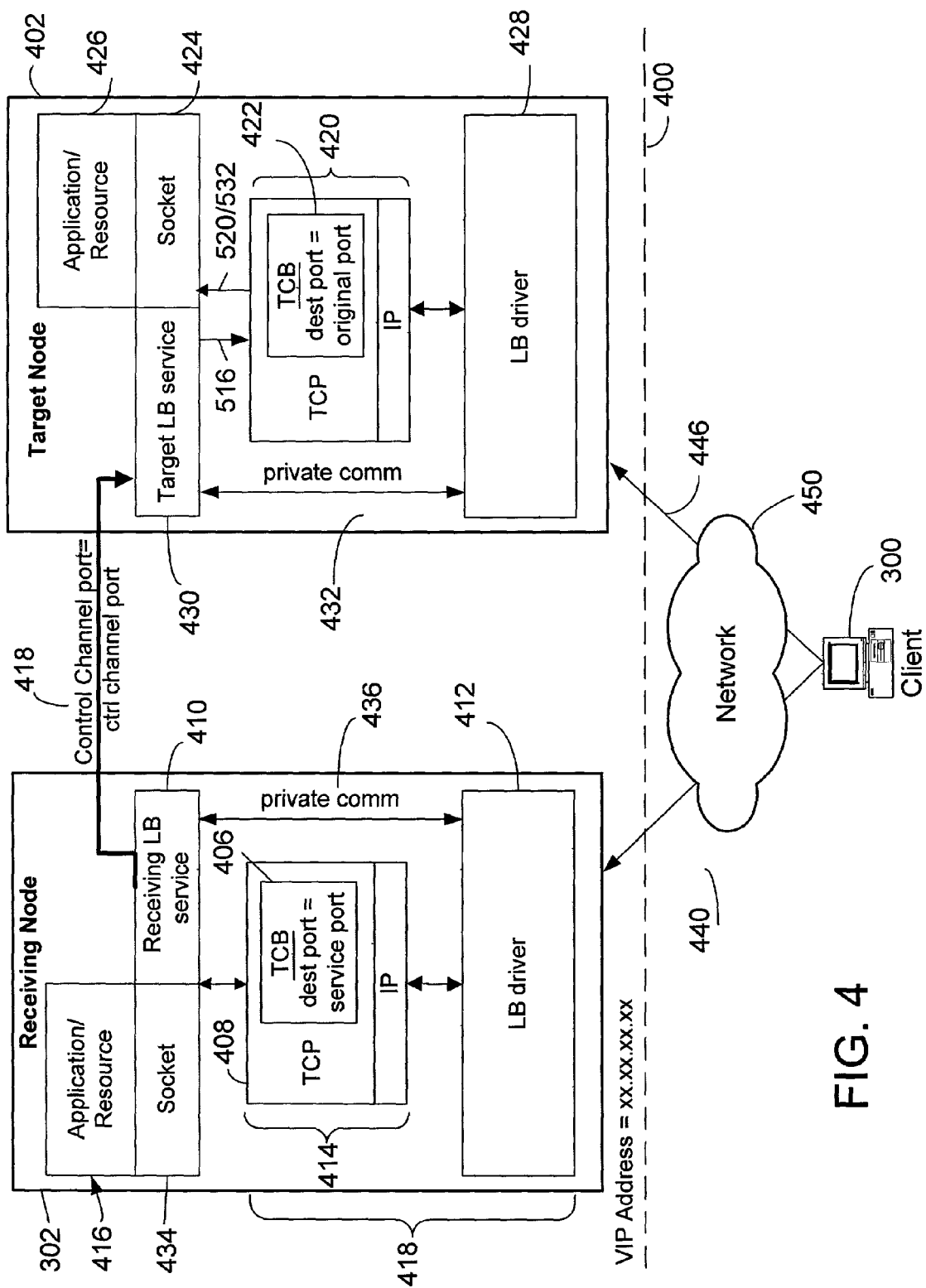
FIG. 4 is a diagram of the migration process as it occurs between two nodes within a load balancing system.

The functionality of the invention is further illustrated with reference to FIG. 4, and the flowcharts of FIGS. 5, 6, 7A and 7B. In FIG. 4, a small memory block known as a TCP control block (TCB) 406 is shown within the TCP stack 408 of a server node 302 that is a member of a load balancing system 400. As a result of the transparent connection created between the client and the server, the TCB specifies the destination port number as that of the LB service 410 instead of the client's intended application or resource 416. Again, this is due to the interception of the packet by the LB driver 412, which in the illustrated embodiment resides within the protocol stack of the node, below the TCP/IP stack 414. The client 300, having established a connection with the receiving node 302, is able to transmit data packets 440 to the server from over the network 450. When the receiving node 302 receives the first one or two data packets 440 (event 506), they are passed up the protocol stack 404, and eventually to the LB service 410 residing on that node—from hereon referred to as the receiving LB service.

In order to prevent the client from transmitting too many data packets after the establishment of the connection, and prior to the determination of a target node 402, the invention calls for the suppression of the ACK (acknowledgement) signal that is normally sent to the client 300 upon receipt of a data packet. As recognized by those skilled in the art, TCP ACK suppression can be accomplished in various ways. One way is to instruct TCP/IP to delay the ACK signal directly until the client data is passed on to the intended (target) application or resource. Another way is to keep the initially received data packets buffered by TCP, instead of passing them immediately to the intended application or resource. In the case of the initially received data packets, the intended resource—the receiving LB service, can "peek" at the data and copy it rather than acquire the data packets by unbuffering the TCP/IP stack. Maintaining buffered data prevents the client from sending more data packets due to TCP's flow control mechanism (sliding window). Typically, one or two packets will be buffered before the client is stopped by TCP's flow control from sending more packets. This data is unbuffered by the receiving LB service and discarded after the migration process is complete to allow flow control to unblock the sender. The passing of data to the client specified resource and the overall migration process are discussed in the foregoing paragraphs in further detail.

After the initial packets are received, the receiving LB service 410 hashes over the resource specific information contained within the data packet(s) by means of a conventional hashing mechanism. Based on the results of the hashing mechanism, the LB service makes a determination as to whether or not to migrate the connection information and associated data to a target node 402 (event 508). By making this determination based on the resource specific information contained within the packet, the receiving LB service 410 can direct the client connection and data to the target node that is aligned with the specified resource and that is best suited for servicing the connection. This method of determination allows for a finer level of connection grouping within the load balancing system, which overcomes the limitations described in the prior art.

When the target node is determined as another node within the load balancing system (event 510), the connection and associated data are obtained from the TCP/IP stack (event 510). This includes the TCB and any other information pertaining to the connection. The connection information and data is migrated to a LB service residing on the identified target node (target LB service) through a connection established over a "control channel" (event 512). The control channel is secured by placing the cluster in a controlled safe environment or through authentication protocols such as IP Security (IPSEC). Also, the IPSEC processing of the packets can be offloaded to hardware accelerators to minimize IPSEC's impact on the performance of the load balancing system. As is commonly known in the art, security is especially important when migrating connections and data in order to prevent denial of service attacks, such as when an attacker impersonates the receiving or target LB node. The control channel 418 is also configured to an exclusive port assigned by the Internet Address Naming Authority (IANA), specifically for use by the members of the cluster for intra-cluster communication. To ensure reliable performance, this port also has a different port number than the assigned port number of the LB service residing on the cluster nodes for receiving client packets (as indicated in FIG. 4).

Once the target LB service 430 receives the connection information and associated data, it passes the connection information to its TCP/IP stack 420 (events 514 and 516). The TCP/IP stack allocates a TCP control block (TCB) 422 utilizing this information, and specifies the destination port as the original number indicated by the client (event 518). TCP/IP 420 then indicates the connection up to the socket 424 and application or resource 426 corresponding to the connection information contained with the TCB 422 (event 520). If this connection is accepted by the application or resource 426 residing on the target node (event 522), the application or resource generates a SUCCESS signal.

The target LB service 430 then passes the migrated data associated with the connection to TCP/IP 420 (event 524), and this data is indicated to the client specified resource or application 426 (event 526). To ensure that the target node 402 processes subsequent packets transmitted by the client 300, the target LB service 430 transmits an ACK signal to the receiving LB service 410 located on the receiving node (event 528). This ACK signal acts a "migration complete" message, which indicates that the receiving node 302 should no longer process packets related to the client whose connection was migrated. Upon receiving the ACK signal, the receiving LB service instructs its corresponding LB driver 412, through a private communication channel 436, to discontinue the processing of packets from this client 300 (event 530).

To commence with the connection migration, the receiving node proceeds to omit all of the connection information corresponding to the migrated connection (event 532). The receiving LB driver 412 performs the omission by deleting the connection descriptor that was created during the time of the "transparent" connection setup. Also, the receiving LB service 410 closes the socket, which deletes the TCB 406 that was allocated for the connection, and enables the client and target node to engage in direct communication 446 over the network 450. No TCP FIN or RST is sent to the client as a result of deleting the TCB because the LB service instructs TCP not to transmit such packets upon closing the socket. This signifies full relinquishment of the client connection by the receiving node. The receiving LB sends a "migration completion ACK confirmation" message (ACK to the ACK sent by the target LB service) to the target LB service (event 534). This indicates to the target LB that it should now start handling the packets from the client.

Once the confirmation message is transmitted, only the target node, and not the receiving node pick up subsequently received packets from the same client. Having gained exclusive ownership of the connection, the target LB service then instructs its corresponding target LB driver 428 through a private communication channel 432, to start processing packets from the client 300 related to the newly established connection (event 534). This completes the migration process in its entirety.

With reference again to FIGS. 6 and 7B, the method of distribution is different when the target node 402 does not accept the migrated connection. This is a worse case scenario within a load balancing system, as ideally, connections should be able to be distributed amongst the collection of nodes that comprise that system and serviced accordingly at any time. In accordance with standard load balancing methods the load and capacity of the target node is taken into account before the connection is migrated. When the target node is unable to handle the connection, such as due to resource restraints, the connection is not migrated. (In general, load and capacity information is shared between nodes through an intra-cluster protocol that is outside the scope of the present invention) In cases where the target node does display such behavior, however, and rejects a connection, TCP/IP transmits a FAILURE signal to the target LB service alerting it of the rejection (event 700). The target LB service 430 then sends a NACK (negative acknowledgement) signal to the receiving LB service 410, which effectively alerts the service that the migration was unsuccessful (event 702).

Upon receiving this notification, the receiving LB service 410 responds by abruptly closing its corresponding socket, which terminates the connection (event 704). TCP/IP 414 within the receiving node then generates and transmits a TCP RST packet to indicate to the client that the connection was dropped (event 706). Again, due to the transparently formed connection—where the source port in the TCP RST packet is changed by the LB driver before it is sent over the wire—the client is unaware that the actual connection dropped was with the receiving LB service 410 and not the client's intended application or resource 426.

Figure 8:
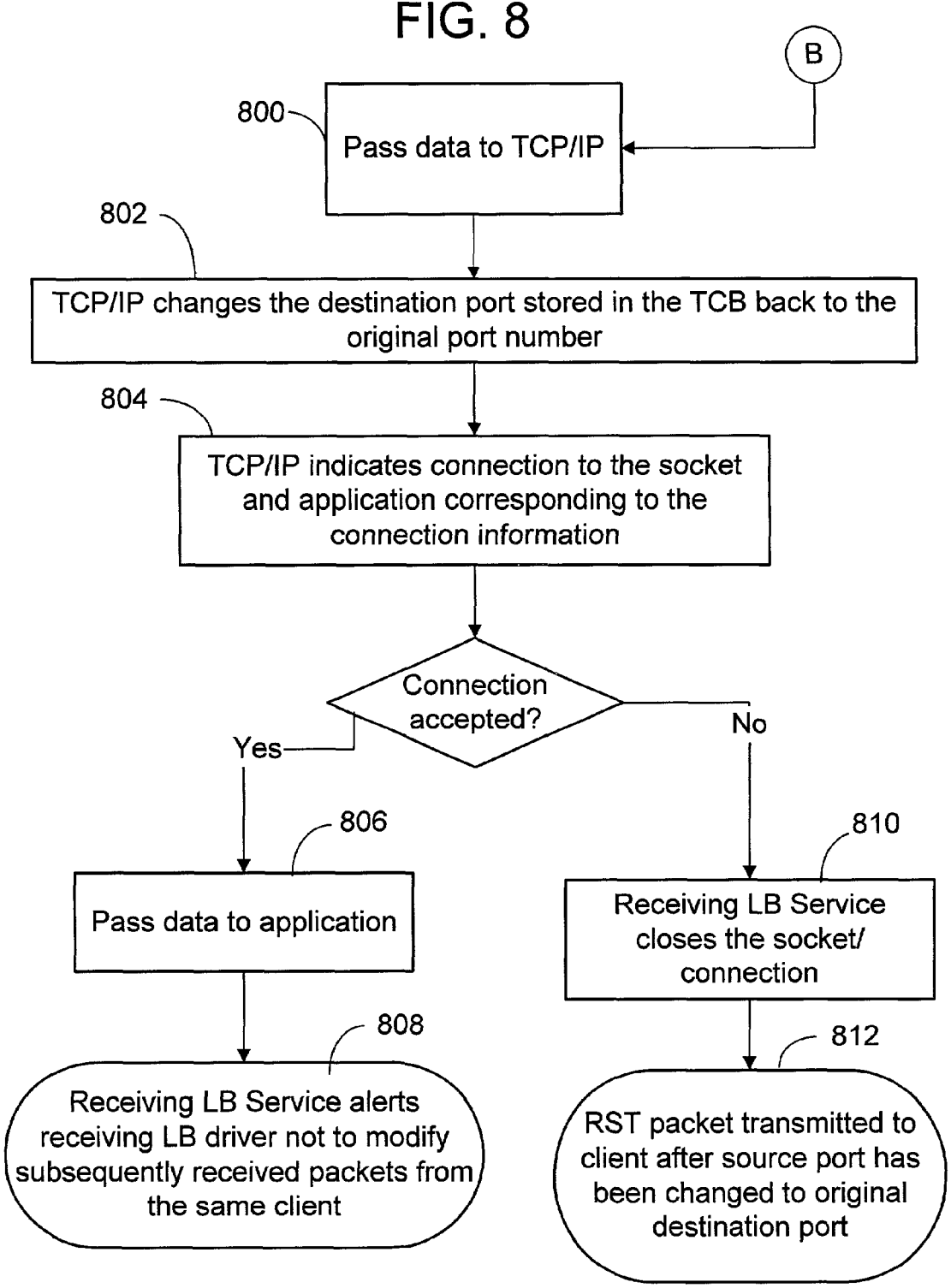
FIG. 8 is a flowchart showing steps executed in an embodiment of the invention to perform migration on the same node within a load balancing system.

Thus far, the description of the invention has related directly to migration of connection information and data between two different nodes—a receiving node and a target node—within a load balancing system. However, a different functionality is required when the receiving node itself is determined by the hashing mechanism (according to the resource specific information within a client data packet) as the target node. This functionality is best illustrated with respect to FIG. 4, and the accompanying flowcharts of FIGS. 5 and 8.

When the receiving LB service 410 receives at least one data packet from the client (event 506) over the established connection, it hashes over the resource specific information contained within the packet in order to make a migration determination (event 508). When the receiving node 302 is itself determined as the target node, the data received from the client is passed back to the TCP/IP stack 414 (FIG. 8, event 800 TCP/IP then changes the destination port stored in the TCB 406 from the port of the LB service, back to the original port number specified initially by the client 300. TCP/IP then indicates the connection up to the socket 434 and application or resource 416 corresponding to the connection information (events 802 and 804). Alternatively, the receiving LB service can peek at the data as TCP/IP buffers it, and then make the migration decision. In this way, the LB service does not have to pass the data back to the stack 414.

If the connection is rejected (such as due to resource constraints), it is terminated by closing the socket (event 810) and transmitting a TCP RST packet to the client. Receipt of the RST (RESET) packet indicates to the client that the connection was dropped (event 812). If the connection is accepted by the desired application or resource 416, the data is passed up to it accordingly (event 806). Then, to ensure normal processing of packets sent by the client 300, the receiving LB service 410 instructs its corresponding LB driver 412 not to modify the destination port information of subsequently received packets related to the connection (event 808). This completes the migration cycle.

Figure 5:
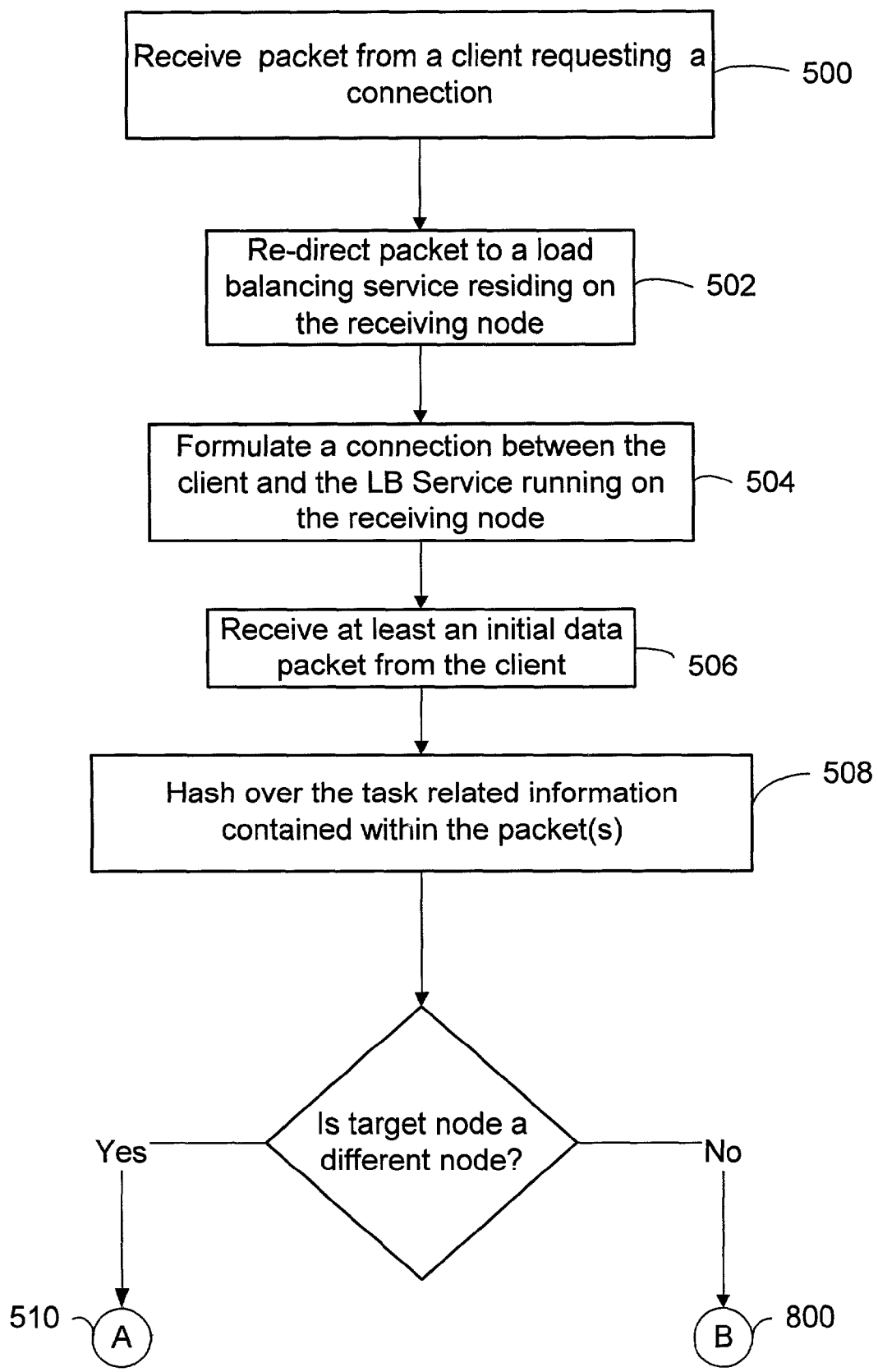
FIG. 5 is a flowchart showing steps executed in an embodiment of the invention to establish a client/server connection and make a migration decision.
Figure 6:
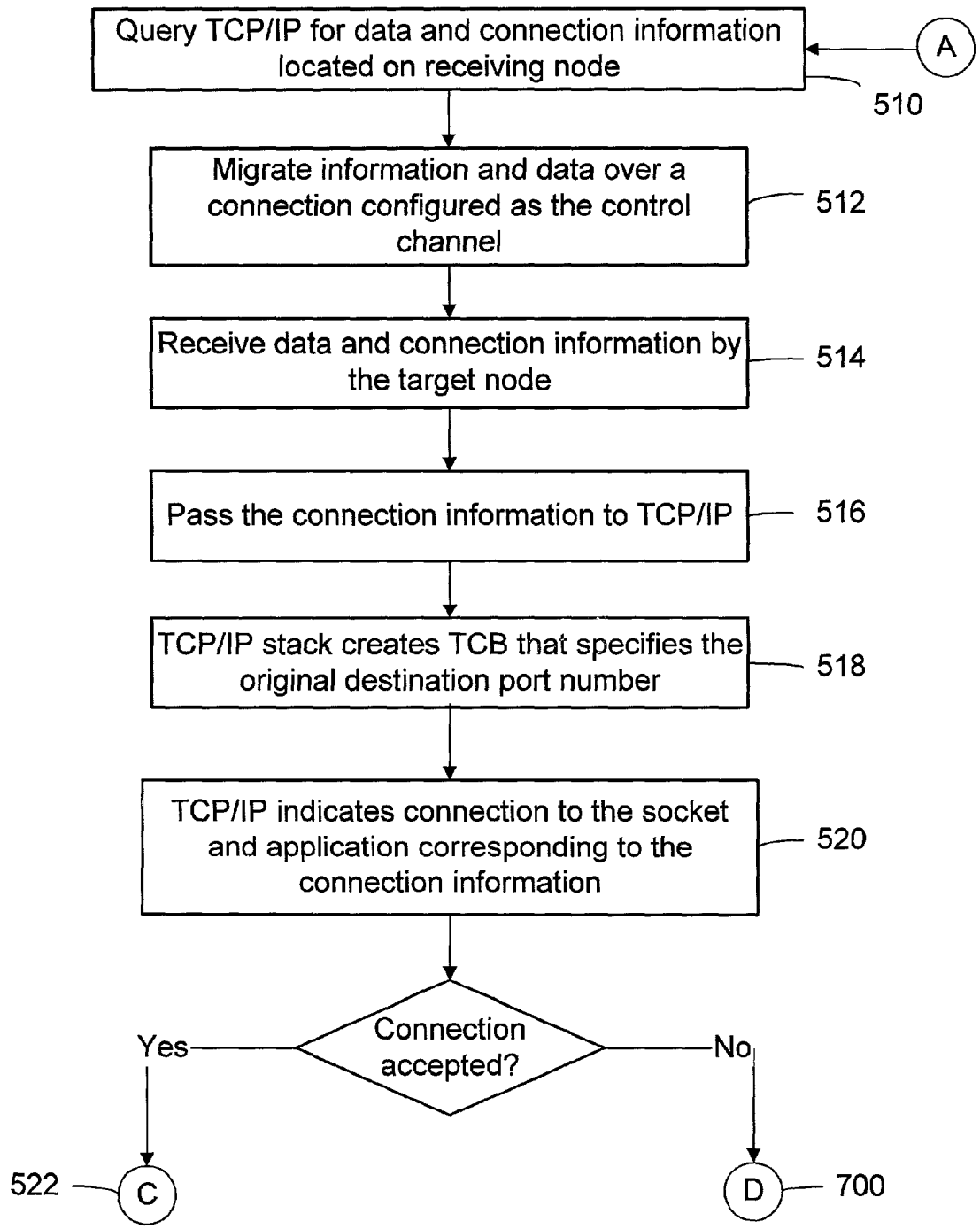
FIG. 6 is a flowchart showing steps executed in an embodiment of the invention to perform migration between nodes within a load balancing system.

As mentioned earlier, the enhancements afforded by the invention apply to any system in which a group of nodes are configured to a network through a shared IP address or virtual IP address. While system 400 in FIG. 5 is shown only as a collection of commonly addressed nodes configured to a VIP address (xx.xx.xx.xx), it will be appreciated by those skilled in the art that this system graphically depicts any network configuration that requires or desires the usage of a shared or virtual IP address.

Overall, the invention provides a simple, efficient and versatile way in which to allow connections related to a specific session to be grouped together, and serviced by the same node within the load balancing system. Unlike conventional systems, this ability is achieved without incurring the overhead of an extra hop due to an agent that acts as the primary dispatcher or proxy between the source and destination nodes. Solutions based on the dispatcher model of distribution utilize a dedicated receiver node as the conduit for all data packets that are sent to the load balancing system. However, these systems suffer not only from the fact that there is an extra hop involved for the packet, but also because the central receiver can become overloaded and thus act as a performance bottleneck. In contrast, the present invention allows connections to be received and intuitively migrated by any node within load balancing system. A dedicated load balancer is not required within the cluster.

The method of connection distribution disclosed applies to any sessions using TCP as the transport mechanism. Furthermore, by employing a method of connection distribution that is dependent upon resource specific information, the discussed limitations associated with some conventional load balancing systems are easily overcome. The usage of resource specific information contained within a received data packet when identified by the load balancing service, allows distribution decisions to be made based upon the node most capable of fulfilling the resource request. Such functionality prevents instances where multiple client requests coming from a single IP address (such as a proxy) are directed to, and eventually overloaded onto a single cluster node as in the single affinity mode of operation.

The invention also prevents related connections having the same IP address but coming from different proxies, from being improperly distributed to different nodes within the load balancing system due to the affinity mode of distribution. This is because packets related to the same session are identified according to the resource specific information within the data packets. Also, the method of connection migration disclosed wherein connections are re-directed to a LB service residing on the node does not require a redirect packet to be sent to the client. As known to those skilled in the art, sending a redirect packet to a client is sometimes not feasible, particularly when there is no dedicated public address of the target node. Moreover, the redirect process often results in increased network latency because an extra round trip is required to establish the client/server connection.

Figure 9:
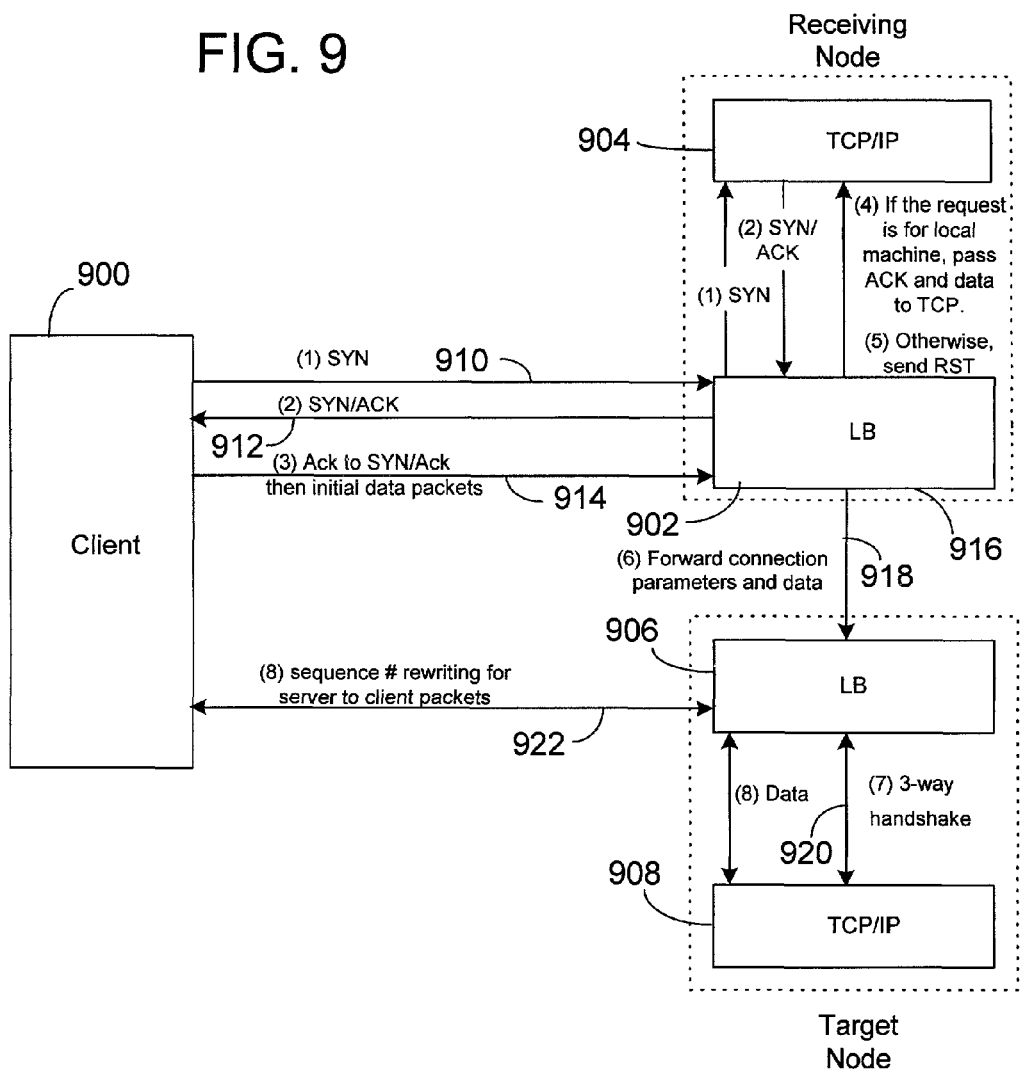
FIG. 9 is a diagram illustrating an alternative embodiment of the claimed invention.

An alternate embodiment is shown in FIG. 9. When the receiving node receives a TCP SYN packet from a client 900 (event 910), the receiving LB driver 902 creates a connection entry and records client specific parameters, including the initial sequence number, TCP window size and other possible TCP options. The LB driver 902 then passes the SYN packet up to the stack 904. Resultantly, the stack sends a SYN ACK (event 912), and the LB driver 902 records the server side parameters and passes the SYN ACK to the client 900. Upon receiving the SYN ACK, the client responds to the server by transmitting an ACK packet (event 922). The LB driver 902, having recorded the client parameters, can easily identify the ACK to the transmitted SYN ACK. The LB driver then holds on to the ACK packet without passing it up to the stack 904. When the client data packets arrive, the LB driver 902 queues them up without passing them up to the stack 904 (accordingly, the LB driver may have to handle IP fragmentation, packet errors, packet loss and any out of order packets).

Figure 10:
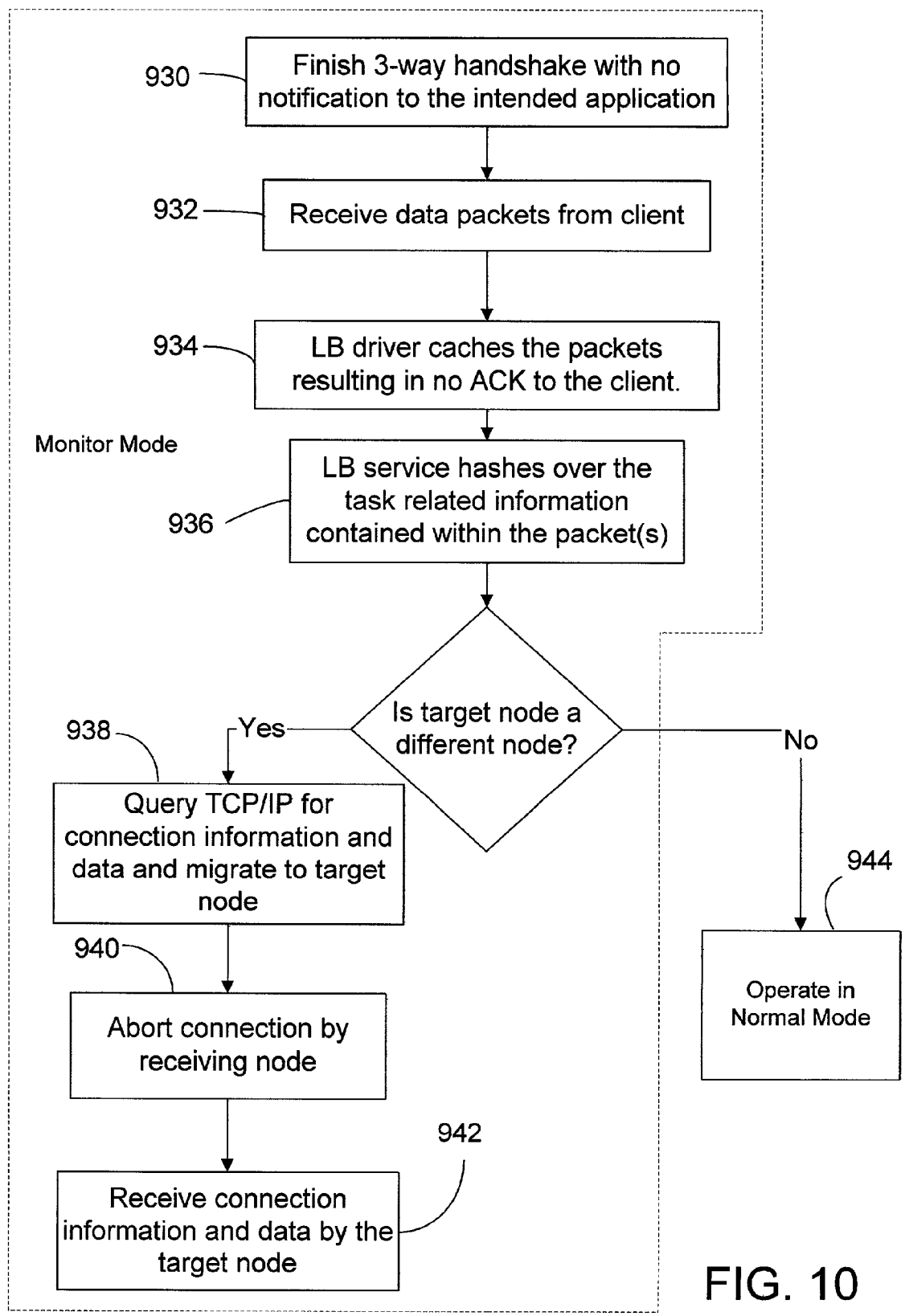
FIGS. 10-11 are flowcharts illustrating the operation of an alternative embodiment of the claimed invention.

Based on the resource specific information contained within the packet, a migration decision is made. If the target node is the receiving node, the LB driver 902 passes up all the packets it buffered to the stack 904. Since the stack assigns the server side initial sequence number, there is no rewriting for outgoing packets. If on the other hand, the target node is a different node, the LB driver 902 on the receiving node sends a RST packet up to the stack 904 (event 916). The receiving LB driver then sends the connection parameters and data packets to the target node (event 918), where its corresponding LB driver 906 performs a 3-way handshake with the stack, then passes data packets up to the stack 908 (event 920). The target LB driver 906 then rewrites the sequence number and checksum for outgoing packets, which maintains the transparent connection (event 922). As can be seen in this implementation, no direct modifications to the IP packet occurs, which can reduce any overhead associated with distributing the connection. Furthermore, this implementation does not require any change in the TCP/IP stack. The migration process is fully transparent to the stack. FIG. 10 is a simple flowchart that illustrates another alternative embodiment. In accordance with this embodiment, the TCP/IP connection is formed according to two modes: a monitored mode and a normal mode (refer to FIG. 10). For each IP address/port that is load balanced by the LB service, TCP/IP initially runs in monitored mode, where the packet distribution control is in the LB service. In monitored mode, TCP/IP finishes the 3-way handshake without notifying the intended client application or resource (event 930). Subsequently transmitted data packets are then cached and no ACK signal is sent to the client (events 932 and 934). After parsing the data packets and hashing over resource specific information, a migration decision is then made by the LB service (event 936). If the receiving node is determined as the target node, the LB service notifies TCP/IP to switch to normal mode (event 944). If the connection is intended for another node, the LB service on the receiving node queries TCP for connection parameters as well as un-indicated data and migrates this information to the target node (event 938). TCP/IP on the receiving node then aborts the connection without sending a TCP RST (RESET) to the client (event 940). Finally, the LB service on the target server receives the forwarding information and inserts the connection to TCP/IP (event 942).

The implementation described above is advantageous in that it does not require the LB driver to make any change (i.e. port change) to the TCP header of the packet, which allows for increased processing of packets. However, the TCP/IP stack must be modified in order to support the monitor mode of operation (i.e. to be able to setup the connection and cache data received over it without indicating the connection or the data to the target application and without sending any ACK for the data to the client).

Figure 11:
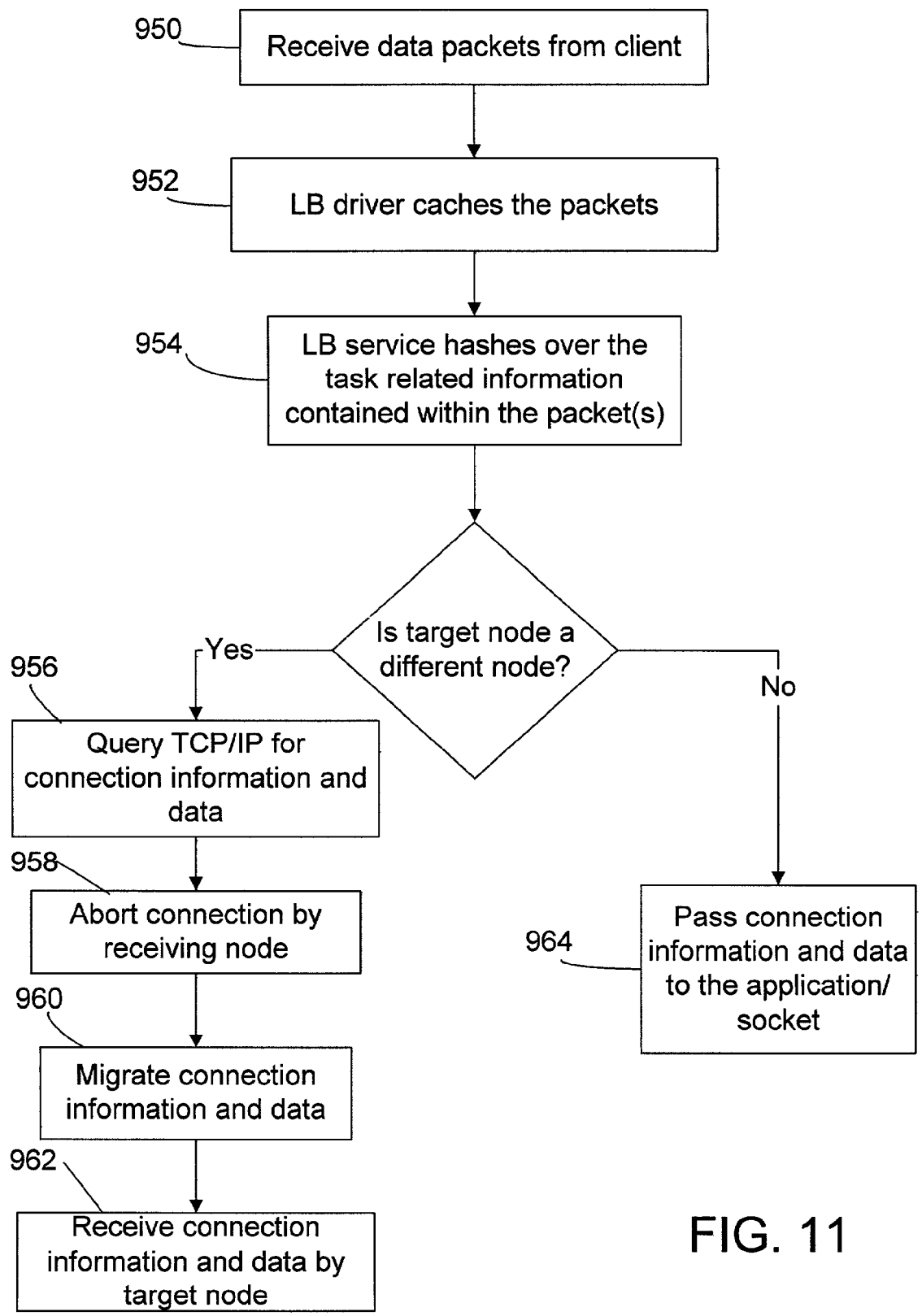

In another alternate embodiment, the LB driver attaches directly to the TCP device, and hence intercepts all TCP interaction with the application/socket (refer to FIG. 11). The LB driver holds onto the connection notification and the first data packets sent by the client (events 950 and 952). Utilizing the resource specific information contained within the data packet, the LB driver makes a migration decision (event 954). If the receiving node is determined as the target node, the receiving LB service passes the connection information and data onto the local application/socket that should receive the data (event 964). Otherwise, the LB service calls into TCP for TCB information (event 956). TCP then returns the information and terminates the connection without sending a TCP RST (RESET) to the client (event 958). The LB service then migrates the TCB, connection indication and data indication to the target node (event 960). On receiving the migrated information, the target LB service inserts the TCB into the TCP stack and then replays the connection indication and data indication to the application/socket listening on the connection port. The advantage of this approach is that TCP does not need to replay the connection/data notification to the application/socket on the receiving machine, since the LB service layered between TCP/IP and the applications does that. It is important to note that this embodiment is different from the embodiment characterized by FIG. 4 in that the LB service is interposed (layered) between the TCP/IP stack and the application such that all connection to the applications have to go through it.

While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims.

We claim:

1. A method for distributing connection information and data related to a client session within a load balancing system having a plurality of nodes, the distribution being made according to resource specific information contained within the initial data packets transmitted by the client, the method comprising:

directly receiving a client connection request packet by any one and only one of the plurality of nodes in the system of load balanced nodes without a centralized load balancing node, each of nodes in the system having an interceptor and a load balancing service residing on each respective node, wherein subsequent client connection requests are received by respective ones and only ones of other nodes of the plurality of nodes;

intercepting the client connection request packet by an interceptor residing on a receiving node determined from amongst the plurality of nodes;

changing a destination port number specified in the intercepted client connection request packet to an assigned port number of a load balancing service residing on the receiving node;

redirecting the packet to the load balancing service on the receiving node using the assigned port number;

accepting the client connection request by the load balancing service residing on the receiving node;

determining a target node to which the connection information and data will be migrated to; and
migrating the connection information and data to the target node.

2. A method as in claim 1, wherein the packet is a TCP SYN packet.

3. A method as in claim 2, wherein the interceptor changes the source port number of subsequently transmitted connection setup packets and ACK packets for the one or more data packets sent by the client from the assigned port number of the load balancing service to the original destination port number before the packets are transmitted to the client.

4. A method as in claim 2, wherein the interceptor changes the destination port number of subsequently transmitted ACK packets sent by the client from the assigned port number of the client specified application to the destination port number of the load balancing service residing on the receiving node.

5. A method as in claim 1, wherein the step of accepting includes establishing a connection between the client and a load balancing service residing on the receiving node.

6. A method as in claim 1, wherein the step of accepting includes allocating a TCP control block and connection descriptor for the connection that specify the destination port number as the assigned port number of the load balancing service residing on the receiving node.

7. A method as in claim 1, wherein the step of accepting further includes receiving at least an initial data packet from the client upon establishment of the connection, the data packet containing the resource specific information.

8. A method as in claim 1, wherein the step of accepting further includes suppressing subsequently transmitted client data packets to minimize the amount of data to be migrated to the target node.

9. A method as in claim 1, wherein the step of determining includes hashing over the resource specific information contained within at least one client data packet.

10. A method as in claim 9, wherein the step of hashing is performed by the receiving node.

11. A method as in claim 1, wherein the step of migrating includes establishing a secure connection through a control channel between the receiving node and the target node when the receiving node is not determined as the target node.

12. A method as in claim 11, wherein the control channel has a different port number than the assigned port number of the load balancing service residing on the target node.

13. A method as in claim 1, wherein the step of migrating includes transferring the connection information and data from the receiving node to a load balancing service residing on the target node when the receiving node is not determined as the target node.

14. A method as in claim 13, wherein the connection information and data is used by the target node to establish a connection between the client and the resource residing on the target node as specified initially by the client.

15. A method as in claim 1, wherein the step of migrating includes servicing the connection by the receiving node when the receiving node is determined as the target node.

16. A method as in claim 1, wherein the step of migrating further includes passing the client data to the resource residing on the target node as specified by the client.

17. A method as in claim 1, further comprising the step of processing any subsequently received packets sent during the same session by the same target node.

18. A hardware computer readable storage medium having further computer executable instructions for performing the steps of:

receiving a client connection request packet by any one and only one of the plurality of nodes in a system of load balanced nodes without a centralized load balancing node, each of nodes in the system having an interceptor and a load balancing service residing on each respective node, wherein subsequent client connection requests are received by respective ones and only ones of other of the plurality of nodes;
intercepting the client connection request packet by an interceptor residing on a receiving node determined from amongst the plurality of nodes;
changing a destination port number specified in the intercepted client connection request packet to an assigned port number of a load balancing service residing on the receiving node;
redirecting the packet to the load balancing service using the assigned port number;
accepting the client connection request by the load balancing service residing on the receiving node;
determining a target node to which the connection information and data will be migrated to; and
migrating the connection information and data to the target node.

19. A method for migrating connection information and data related to a client session between nodes within a load balancing system having a plurality of nodes, the method comprising the steps of:
receiving a client connection request packet by any one and only one of the plurality of nodes in the system of load balanced nodes, each of nodes in the system having an interceptor and a load balancing service residing on each respective node, wherein subsequent client connection requests are received by respective ones of other of the plurality of nodes;
intercepting the client connection request packet by an interceptor residing on a receiving node determined from amongst the plurality of nodes;
changing a destination port number specified in the intercepted client connection request packet to an assigned port number of a load balancing service residing on the receiving node;
redirecting the packet to the load balancing service;
determining a target node that the connection information and data will be migrated to;
migrating the connection information and data to another load balancing service residing on the target node; and
establishing a connection between the client and the target node;
wherein the step of determining includes hashing over resource specific information contained within the client connection request packet sent during the client session by only the receiving node.

20. A method as in claim 19, wherein the packet is a client TCP SYN.

21. A method as in claim 20, wherein the interceptor changes the source port number of subsequently transmitted connection setup packets and ACK packets for the one or more data packets sent by the client from the assigned port number of the load balancing service to the original destination port number before the packets are transmitted to the client.

22. A method as in claim 20, wherein the interceptor changes the destination port number of subsequently transmitted ACK packets sent by the client from the assigned port number of the client specified application to the destination port number of the load balancing service residing on the receiving node.

23. A method as in claim 19, wherein the step of redirecting further includes establishing a session between the client and the load balancing service residing on a receiving node.

24. A method as in claim 19, wherein the step of hashing is performed by the same node within the load balancing system that accepted the client connection request.

25. A method as in claim 19, wherein the step of migrating includes querying TCP/IP at the receiving node to obtain the connection information and associated data.

26. A method as in claim 19, wherein the step of migrating includes establishing a secure connection through a control channel between the receiving node and the target node.

27. A method as in claim 26, wherein the control channel has a different port number than the assigned port number of the load balancing service residing on the target node.

28. A method as in claim 19, wherein the step of migrating includes transferring the connection information and data from the receiving node to a load balancing service residing on the target node.

29. A method as in claim 19, wherein the step of migrating further includes passing the connection information to the TCP/IP stack of the target node.

30. A method as in claim 19, wherein the step of establishing comprises:
- allocating a TCP control block, the TCP control block specifying the destination port number as that indicated initially by the client;
- notifying the application and socket corresponding to the specified destination port of the connection;
- wherein acceptance of the connection by the application is indicated by returning a SUCCESS signal and passing the client data to TCP/IP to be indicated to the specified resource;
- wherein rejection of the connection results in TCP/IP on the target node communicating FAILURE to the target load balancing service, such that the target load balancing service transmits a NACK signal to the load balancing service residing on the receiving node;
- sending a migration complete ACK signal from the target load balancing service to the load balancing service residing on the receiving node upon passage of the data to the specified target resource to indicate the successful migration of the connection information and data;
- receiving an ACK from the load balancing service residing on the receiving node in response to the migration complete ACK signal sent by the target load balancing service; and
- sending an instruction from the target load balancing service to a target load balancing driver indicating that the target load balancing driver can start processing packets from the client whose connection was successfully migrated.

31. A method as in claim 19 further including the step of instructing the load balancing driver on the receiving node to stop accepting packets on that connection from the client, and instructing TCP/IP on the receiving node to delete the TCP control block and connection descriptor associated with migrated connection upon receiving an ACK signal from the target node.

32. A method as in claim 19 further including the step of terminating the client connection upon receiving a NACK signal from the target load balancing service, the connection being terminated by the load balancing service residing on the receiving node.

33. A method as in claim 32, wherein the client connection is terminated by closing the socket for the connection and transmitting a TCP RST packet to the client.

34. A method as in claim 33, wherein a source port data field of the TCP RST packet is modified by the interceptor to indicate the port number of the client specified resource.

35. A method as in claim 19, further comprising the step of processing any subsequently received packets sent during the same session by the same target node.

* * * * *